(12) United States Patent
Accardi et al.

(10) Patent No.: US 11,627,238 B2
(45) Date of Patent: Apr. 11, 2023

(54) SYSTEM AND METHOD FOR CONNECTING MULTIPLE VIDEO, METADATA AND REMOTE TELECOMMAND SIGNALS FOR TELEPROMPTING AND OTHER APPLICATIONS

(71) Applicant: CueScript Inc., Stratford, CT (US)

(72) Inventors: Michael Anthony Accardi, Fairfield, CT (US); William Peter Garrett, Owslebury (GB)

(73) Assignee: CueScript Inc., Stratford, CT (US)

( * ) Notice: Subject to any disclaimer, the term of this patent is extended or adjusted under 35 U.S.C. 154(b) by 0 days.

(21) Appl. No.: 17/263,273

(22) PCT Filed: Apr. 6, 2020

(86) PCT No.: PCT/US2020/026867
§ 371 (c)(1),
(2) Date: Jan. 26, 2021

(87) PCT Pub. No.: WO2020/206422
PCT Pub. Date: Oct. 8, 2020

(65) Prior Publication Data
US 2021/0152714 A1    May 20, 2021

Related U.S. Application Data

(60) Provisional application No. 62/829,911, filed on Apr. 5, 2019.

(51) Int. Cl.
*H04N 5/222* (2006.01)
*H04N 5/278* (2006.01)
*H04N 21/488* (2011.01)

(52) U.S. Cl.
CPC .......... *H04N 5/2222* (2013.01); *H04N 5/278* (2013.01); *H04N 21/4882* (2013.01); *H04N 21/4888* (2013.01)

(58) Field of Classification Search
CPC ................. H04N 5/2222; H04N 5/278; H04N 21/4882; H04N 21/4888; H04N 5/222;
(Continued)

(56) References Cited

U.S. PATENT DOCUMENTS

| | | | |
|---|---|---|---|
| 7,474,852 B1 * | 1/2009 | Jachetta | H04N 7/181 398/33 |
| 10,609,404 B2 * | 3/2020 | Kurokawa | H04N 19/44 |
| 2005/0060741 A1 * | 3/2005 | Tsutsui | H04N 21/4722 725/32 |

(Continued)

FOREIGN PATENT DOCUMENTS

| | | |
|---|---|---|
| CN | 1192619 C | 3/2005 |
| EP | 1667466 A1 | 6/2006 |

(Continued)

*Primary Examiner* — Brian P Yenke
*Assistant Examiner* — Humam M Satti
(74) *Attorney, Agent, or Firm* — Ryan, Mason & Lewis, LLP

(57) ABSTRACT

An apparatus comprises at least one processing device, the at least one processing device being configured to receive an encapsulation of two or more types of content associated with a camera system, the two or more types of content comprising one or more video signals and one or more data signals. The at least one processing device is also configured to separate the encapsulation into the two or more types of content to obtain the one or more video signals and the one or more data signals, to output at least a given one of the one or more video signals to a first display unit, and to provide at least a given one of the one or more data signals to at least one of (i) a controller associated with the first display unit and (ii) a second display unit.

20 Claims, 5 Drawing Sheets

(58) Field of Classification Search
CPC ...... H04N 7/08; H04N 21/434; H04N 5/9201;
H04N 19/46; H04N 5/77; H04N 55/772;
H04N 5/44–44504; H04N 21/40; H04N
21/43; H04N 19/00; H04N 19/44; H04N
5/2224; H04N 5/2228; H04H 20/28;
H04H 20/00; H04H 20/02; H04H 20/04;
H04H 20/06; H04H 20/08; H04H 20/10;
H04H 20/103; H04H 20/106; H04H
20/12; H04H 20/14; H04H 20/18; H04H
20/26; H04H 20/38; H04H 20/44; H04H
20/46; H04H 20/65; H04H 20/71; H04H
20/76; H04H 20/72; H04H 20/74; H04H
20/93; H04H 20/95; H04H 40/00; H04H
40/09; H04H 40/18; H04H 40/27; H04H
2201/00; H04H 2201/10; H04H 2201/11;
H04H 2201/12; H04H 2201/13; H04H
2201/14; H04H 2201/15; H04H 2201/16;
H04H 2201/17; H04H 2201/18; H04H
2201/183; H04H 2201/186; H04H
2201/19; H04H 2201/30; H04H 2201/40;
H04H 2201/50; H04H 2201/60; H04H
2201/70; H04H 2201/90; H04H 2201/80

See application file for complete search history.

(56) References Cited

U.S. PATENT DOCUMENTS

| | | | |
|---|---|---|---|
| 2005/0097613 A1* | 5/2005 | Ulate | H04N 5/2222 725/86 |
| 2007/0199043 A1 | 8/2007 | Morris | |
| 2010/0026809 A1* | 2/2010 | Curry | H04N 5/222 348/157 |
| 2011/0069229 A1* | 3/2011 | Lord | H04N 9/8205 348/461 |
| 2015/0042890 A1* | 2/2015 | Messmer | H04N 5/20 348/725 |
| 2015/0288919 A1* | 10/2015 | Labosco | G09G 5/008 348/445 |
| 2017/0302795 A1* | 10/2017 | Wolzien | H04M 7/003 |
| 2018/0070026 A1* | 3/2018 | Nussbaum | H04N 5/23293 |
| 2018/0332216 A1 | 11/2018 | Long et al. | |
| 2020/0387774 A1* | 12/2020 | Williams | G06N 3/0427 |

FOREIGN PATENT DOCUMENTS

| | | |
|---|---|---|
| EP | 1262063 B1 | 11/2007 |
| WO | 2013155207 A1 | 10/2013 |
| WO | 2016009193 A1 | 1/2016 |
| WO | 2019056001 A1 | 3/2019 |
| WO | PCT/US2020/026867 | 6/2020 |

* cited by examiner

SYSTEM AND METHOD FOR CONNECTING MULTIPLE VIDEO, METADATA AND REMOTE TELECOMMAND SIGNALS FOR TELEPROMPTING AND OTHER APPLICATIONS

RELATED APPLICATIONS

The present application is an international application which claims the benefit of and priority to U.S. Provisional Application Ser. No. 62/829,911, filed on Apr. 5, 2019, the disclosure of which is incorporated by reference herein.

FIELD

The field relates generally to signal distribution for camera systems and other related systems, and in some embodiments more particularly relates to signal distribution in the context of teleprompting and other types of visual communication presented to a subject of a camera of a camera system.

BACKGROUND

Teleprompting is an established art which provides information to the subject of a camera usually in the form of scripted text to be read by the in vision subject "talent." In typical uses, such as studios or outside broadcast events, multiple systems are added to the camera to support production workflow and can include a teleprompt monitor showing script and talent messages, an additional monitor visible to the talent which can show "on-air" output and other moving video, and time-clocks and annunciator lights showing which is the active on-air camera in a multiple camera deployment.

The growth in the number of systems now deployed at the camera has resulted in an increase in the number of cables needed to connect related systems to the host environment, typically but not limited to, the studio facility's broadcast infrastructure, production areas (studio galleries), etc.

SUMMARY

Illustrative embodiments provide systems and methods for connecting multiple video, metadata and remote tele-command signals of camera systems and other related systems in applications such as teleprompting. Such embodiments considerably simplify the connectivity of on-camera systems configured to support teleprompting and other types of visual communication presented to a subject of a camera.

By way of example and without limitation, some embodiments are configured for the provision of all required electronic communication signals, including video, metadata and remote tele-command signals, through a single physical bearer cable, such as a single fibre optic cable. In an arrangement of this type, all connectivity other than power provision is illustratively provided through the single fibre optic cable.

In one illustrative embodiment, an apparatus comprises at least one processing device comprising a processor coupled to a memory. The at least one processing device is configured to receive an encapsulation of two or more types of content associated with a camera system, the two or more types of content comprising one or more video signals and one or more data signals. The at least one processing device is also configured to separate the encapsulation into the two or more types of content to obtain the one or more video signals and the one or more data signals, to output at least a given one of the one or more video signals to a first display unit, and to provide at least a given one of the one or more data signals to at least one of (i) a controller associated with the first display unit and (ii) a second display unit. The encapsulation may be received over the single physical bearer cable. The apparatus may comprise a teleprompt display unit, and the first display unit may be part of teleprompt display unit.

Illustrative embodiments provide significant advantages relative to conventional approaches.

For example, some embodiments reduce the demand of connecting ports and thus lower cost and physical overhead in host environments.

As another example, some embodiments simplify connectivity between on-camera systems and host environments thus reducing the number of "trailing" connecting cables.

As a further example, some embodiments improve system reliability by simplifying connectivity.

As indicated above, in some embodiments, all electronic signals between related camera systems and their interconnecting technologies in the host environment are integrated via a single fibre optical cable.

For example, in some embodiments of this type, a video signal for the rendered prompt script and talent messages, a video signal for the on-air (talent) monitor, tele-command signals for configuration and settings of all related systems and time information, are all encapsulated in Internet Protocol (IP) and transported on a single physical bearer cable, illustratively a single fibre optic cable.

Separation of the various signals in some embodiments is implemented in a teleprompt monitor which is configured to feed all signals to the related systems. Such a teleprompt monitor in one or more illustrative embodiments is configured to include electronic circuitry and software to manage the de-capsulation of the IP layer and to route appropriate signals to the intended destination components of the related systems. Configuration and behavior of such systems in illustrative embodiments are also controlled by signals carried on the single physical bearer cable as remote tele-command messages.

These and other illustrative embodiments include but are not limited to systems, methods, apparatus, integrated circuits and computer program products comprising processor-readable storage media.

DETAILED DESCRIPTION

Illustrative embodiments will be described herein with reference to exemplary camera systems, related systems and associated computers and other processing devices. It is to be appreciated that the embodiments described below are presented by way of example only, and should not be construed as limiting in any way. The term "system" as used herein is intended to be broadly construed, and in some embodiments can comprise a camera system and one or more related systems.

Figure 1:
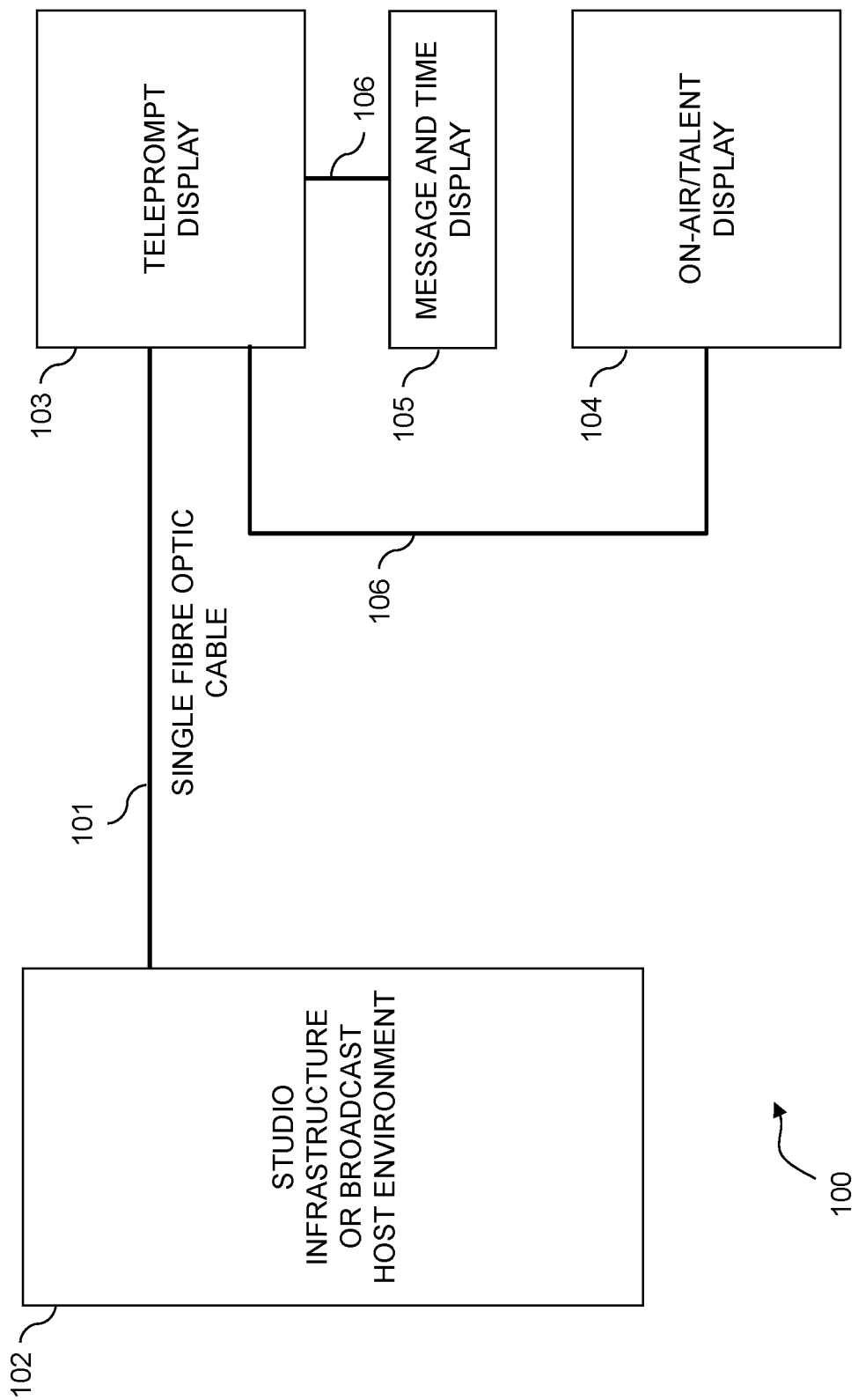
FIG. 1 is a block diagram of a system comprising a teleprompt display unit interconnected with a single fibre optic cable carrying video and metadata signals that are separated and subsequently routed to destination components in an illustrative embodiment.

FIG. 1 shows an example of a system 100 in an illustrative embodiment. The system 100 comprises studio infrastructure or an outside broadcast host 102 which is coupled via an IP interconnection over a single physical bearer cable, illustratively a single fibre optic cable 101, to a teleprompt display unit 103. As used herein, the term "single fibre optic cable" refers to a physical implementation of an IP fibre optic link. The IP fibre optic link is assumed to contain a bidirectional transport layer to support full duplex communications. In some embodiments, the IP fibre optic link is implemented as two fibre strands, each supporting one direction of the transport layer. This configuration is implemented as a single physical cable with a connector at each end. The teleprompt display unit 103 illustratively comprises a teleprompt monitor, including associated signal processing circuitry and software of the type disclosed herein, configured to present a video signal for a rendered prompt script and/or talent messages.

The system 100 further comprises an on-air/talent display unit 104 and a message and time display unit 105, both coupled to the teleprompt display unit 103 via conventional cables 106. The IP interconnection over the single fibre optic cable 101 in the present embodiment carries multiple services, including encapsulated video as well as data and/or metadata. The on-air/talent display unit 104 and a message and time display unit 105 are examples of what are referred to herein as related systems relative to a camera system that is used to capture video of a subject of a camera. These related systems 104 and 105 are illustratively provided with baseband video signals or serialised data from the teleprompt display unit 103 over the conventional cables 106, in a manner to be described in more detail below in conjunction with FIGS. 2 and 3. The on-air/talent display unit 104 illustratively comprises an on-air/talent monitor configured to present a video signal for an on-air/talent display.

Figure 2:
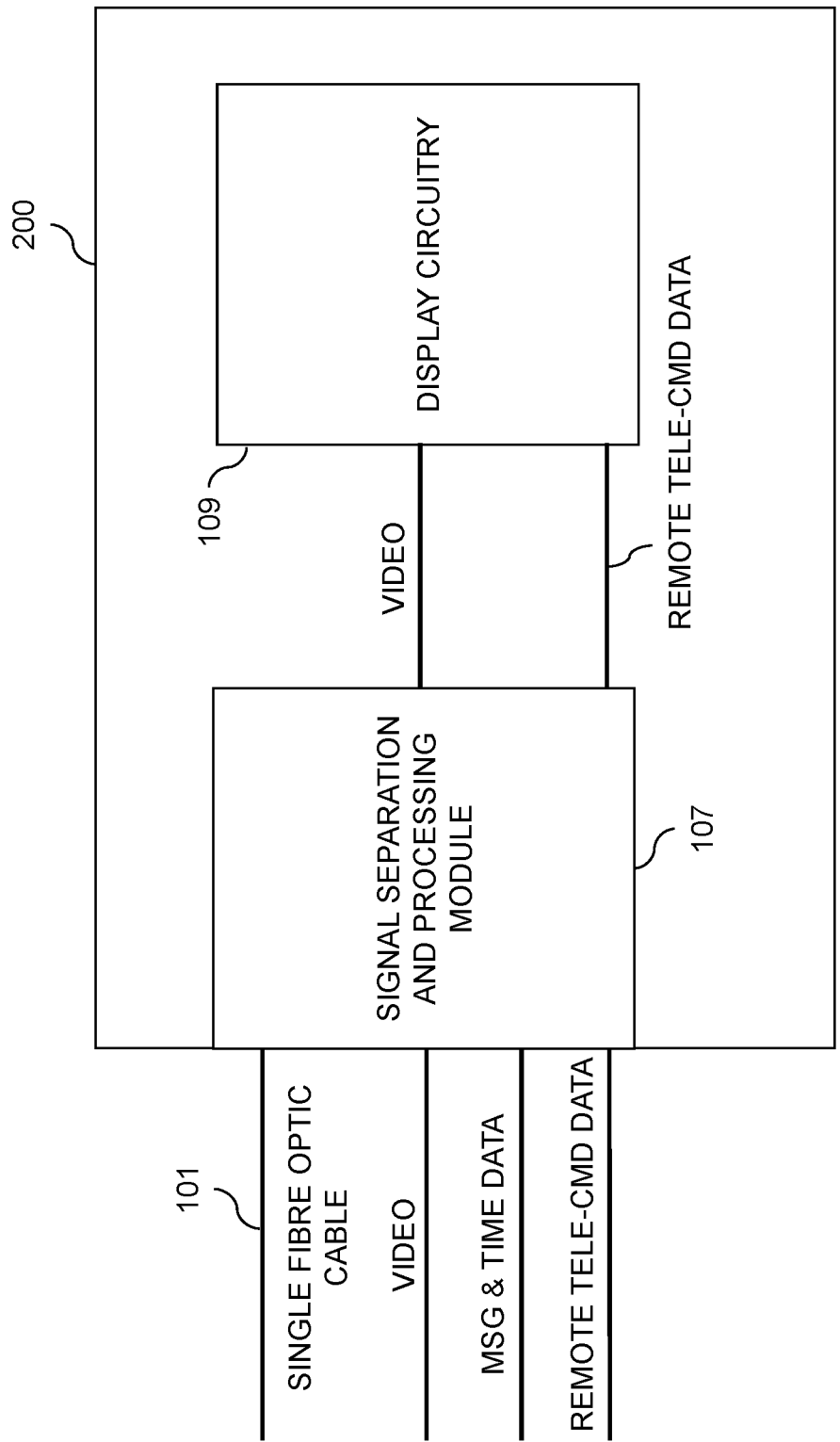
FIG. 2 shows a more detailed view of at least a portion of the teleprompt display unit of the FIG. 1 system in an illustrative embodiment.

Referring now to FIG. 2, at least a portion 200 of the teleprompt display unit 103 of FIG. 1 is shown in greater detail. The portion 200 in this illustrative embodiment comprises a signal separation and processing module 107 coupled to display circuitry 109. The teleprompt display unit 103 receives encapsulated video and data of the multiple services carried by the IP interconnection over the single fibre optic cable 101. As noted above, the encapsulated video and data in some embodiments additionally or alternatively comprises metadata.

By way of example, the multiple services illustratively comprise a video signal for the rendered prompt script and talent messages, a video signal for the on-air/talent display unit 104, tele-command signals for configuration and settings of all related systems, and time information, all encapsulated in the IP interconnection carried by the single fibre optic cable 101. Other arrangements of multiple video, metadata and/or remote tele-command signals of camera systems and other related systems can be carried over an IP interconnection to teleprompt display unit 103 in other embodiments. As used herein, the term "video signal" is intended to be broadly construed to include one or more video streams and one or more audio streams. For example, a given video signal may include a video stream with one or more channels of audio embedded therein. A given video signal may also include multiple video streams, each including one or more channels of audio embedded therein. Thus, it should be understood that references to video and video signals herein include video and associated embedded audio, including multi-channel embedded audio.

In the FIG. 2 embodiment, the signal separation and processing module 107 is illustratively configured to separate the encapsulated video and data of the multiple services carried by the IP interconnection and to route the resulting video and data signals to their appropriate destinations. For example, the video signal for the rendered prompt script and talent messages is routed from the signal separation and processing module 107 to the display circuitry 109 for presentation to the talent, and the video signal for the on-air/talent display unit 104 is provided thereto by the signal separation and processing module 107 of the teleprompt display unit 103 over a corresponding one of the cables 106 of FIG. 1. Message and time data are distributed to message and time display unit 105 over a corresponding one of the cables 106 of FIG. 1, illustratively in a serialised data format. Signals comprising remote tele-command data for configuration and operational settings are also distributed by the signal separation and processing module 107, illustratively to the on-air/talent display unit 104, the message and time display unit 105 and/or the display circuitry 109.

Figure 3:
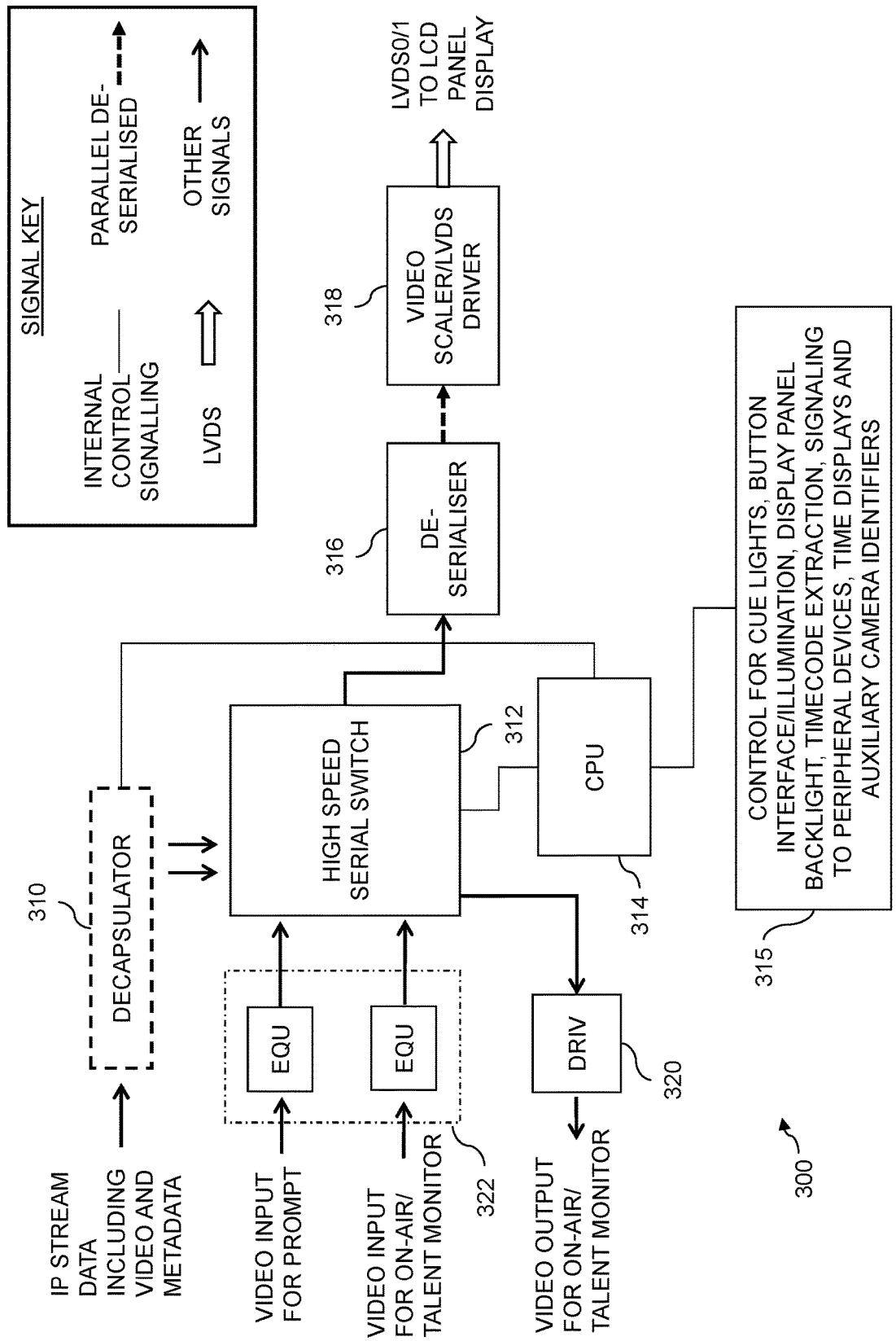
FIG. 3 illustrates one possible implementation of a signal separation and processing module of the teleprompt display unit of FIG. 2 in an illustrative embodiment.

FIG. 3 shows circuitry 300 that comprises at least a portion of the signal separation and processing module 107 of FIG. 2 in an illustrative embodiment. The circuitry 300 in this particular embodiment comprises a decapsulator 310, a high speed serial switch 312, a central processing unit (CPU) 314, controls 315, a de-serialiser 316, a video scaler/low voltage differential signaling (LVDS) driver 318, a line driver 320 and multiple equalizers 322. FIG. 3 also shows a signal key with different types of lines and arrows for representing different types of signaling, such as internal control signaling, parallel de-serialised signaling, LVDS signaling, and other signals (e.g., input signals, output signals, etc.).

The decapsulator 310 receives incoming IP stream data including encapsulated video and metadata via the single fibre optic cable 101, and provides the individual video and data signals to the high speed serial switch 312. The decapsulator 310 may comprise any decapsulator configured to support the functionality described herein, including the ability to support multiple content streams within the teleprompt display unit 103.

In illustrative embodiments, the high speed serial switch 312 comprises a 3.2 Gigabit/second serial data rate ASIC semiconductor device with 8 ports, where each port supports the stated data rate. It should be appreciated, however, that in other embodiments the high speed serial switch 312 may support other data rates (e.g., higher or lower than 3.2 Gigabit/second) with different numbers of ports (e.g., more or fewer than 8) as desired. The high speed serial switch 312 supports functionality for routing serial streams of data which contain content such as video, audio, data, metadata, etc. In some embodiments, this functionality enables the teleprompt display unit 103 to provide an auxiliary second video, audio and data output via the cabling 106. The high speed serial switch 312 further enables the utilization of the capabilities of the decapsulator 310, which would otherwise only result in the display of a single video stream. This reduces the number of decapsulators needed to support multiple displays, thus resulting in lower cost, reduced cabling, a reduction in connecting ports in the host environment, etc.

The video signal for the rendered prompt script is routed by the high speed serial switch 312 to the de-serialiser 316 and the resulting deserialised output is provided to the video scaler/LVDS driver 318 which generates an LVDS0/1 video signal for an LCD panel display of the teleprompt display unit 103.

The video signal for the on-air/talent display unit 104 is routed by the high speed serial switch 312 to the line driver 320 for delivery to the on-air/talent display unit 104.

The high speed serial switch 312 in the present embodiment can also receive video inputs for teleprompting display and/or for on-air/talent display. Such video inputs are illustratively processed by respective ones of the equalizers 322 before being applied to the high speed serial switch.

The de-serialiser 316 line driver 320 and equalizers 322 may be implemented using ASIC semiconductors suitably configured to provide the functionality described herein. The CPU 314 runs one or more custom and specifically written computer compiled binary programs for orchestrating operations within the teleprompt display unit 103, and supplies specific signaling to peripheral devices (e.g., on-air/talent display unit 104, message and time display unit 105, etc.) via cabling (e.g., 106). The video scaler/LVDS driver 318 in some embodiments is implemented using an ASIC semiconductor designed for scaling and formatting digital video signals, and producing LVDS signals for driving a display panel of the teleprompt display unit 103. The video scaler/LVDS driver 318 may have a specific program configuration, and is a target device for the compiled binary programs running in the CPU 314.

The controls 315 in this embodiment illustratively comprise controls for various components of the teleprompt display unit 103. In some embodiments, the controls 315 may be further or alternatively utilized for controlling components of peripheral devices such as the on-air/talent display unit 104 and message and time display unit 105. Such components of the teleprompt display unit 103 and peripheral devices may include one or more of cue lights, button interfaces and illumination, display panel backlights, timecode extraction, signaling to peripheral devices, time displays and auxiliary camera identifiers, etc. It should be appreciated, however, that various other additional or alternative controls could be provided and processed by the CPU 314 in other embodiments.

Additionally or alternatively, a stream of images of a given one of the individual video signals carried by the IP interconnection over the single fibre optic cable 101, illustratively the video signal for the rendered prompt script, can be processed in a manner that provides a desired type of reflection effect in the resulting output video signal delivered to the display circuitry 109. For example, the images of the given video signal can be processed to provide a rotation in the resultant displayed video, typically by 90 or 180 degrees, relative to the stream of images in the original video signal. The reflection of the images may be about a horizontal or vertical axis in the images, or may be about some other axis. Numerous other types of signal processing can be provided in other embodiments.

In some embodiments, the encapsulated video and data carried by the IP interconnection over the single fibre optic cable are configured in accordance with the SMPTE 2110 or 2022 standards, although other standards and formats can be used in other embodiments, including for various other baseband (e.g., non-IP) protocols. The SMPTE 2110 standards are generally video-format-agnostic and therefore support Ultra HD, HDR, and other new and emerging formats.

The particular arrangements illustrated in FIGS. 1 through 3 are presented by way of example only, and should not be construed as limiting in any way. For example, although described in the context of teleprompt display unit 103 and on-air/talent display unit 104, the disclosed techniques can be applied in numerous other contexts involving camera systems and/or one or more related systems.

Figure 4:
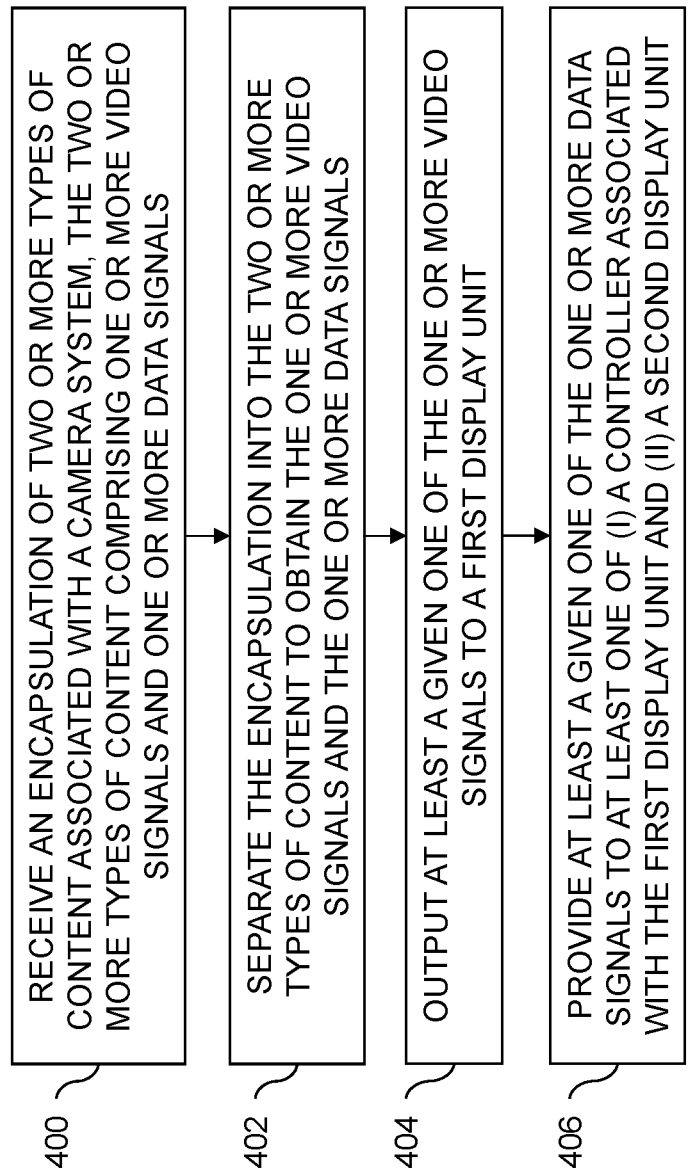
FIG. 4 is a flow diagram of an exemplary process for processing an encapsulation of multiple video and data signals in an illustrative embodiment.

An exemplary process for processing an encapsulation of multiple video and data signals will now be described in more detail with reference to the flow diagram of FIG. 4. It is to be understood that this particular process is only an example, and that additional or alternative processes for processing an encapsulation of multiple video and data signals can be carried out in other embodiments.

In this embodiment, the process includes steps 400 through 406. These steps are assumed to be performed by the signal separation and processing module 107 of the teleprompt display unit 103, utilizing the circuitry 300. The process begins with step 400, receiving an encapsulation of two or more types of content associated with a camera system, the two or more types of content comprising one or more video signals and one or more data signals. The encapsulation may be received in step 400 via a stream of IP packets or other data. In some embodiments, the encapsulation is received over a single physical bearer cable (e.g., a single fibre optic cable 101 as illustrated in FIGS. 1 and 2). The encapsulation received in step 400 may be obtained from a studio infrastructure or broadcast host environment (e.g., 102).

In step 402, the encapsulation is separated into the two or more types of content (e.g., utilizing decapsulator 310) to obtain the one or more video signals and the one or more data signals in the encapsulation. At least a given one of the one or more video signals is output to a first display unit (e.g., teleprompt display unit 103 utilizing display circuitry 109) in step 404, and at least a given one of the one or more data signals is provided to at least one of (i) a controller (e.g., controls 315) associated with the first display unit and (ii) a second display unit (e.g., on-air/talent display unit 104, message and time display unit 105) external to the first display unit in step 406. The given data signal may be provided to the second display unit in step 406 over one or more additional physical bearer cables (e.g., different than the single physical bearer cable over which the encapsulation is received in step 400).

In the description below, it is assumed that the first display unit comprises the teleprompt display unit 103, and that the second display unit comprises one of the on-air/talent display unit 104 and message and time display unit 105. The encapsulation received in step 400 may be obtained from a studio infrastructure or broadcast host environment 102 that captures video of one or more subjects that utilize the teleprompt display unit 103. The given video signal output in step 404 may comprise at least one of a rendered prompt script and one or more messages for display to such subjects. The given data signal provided in step 406 may comprise at least one of messaging and timing information that is provided to the message and time display unit 105. In some embodiments, such message and timing information may also be provided to the teleprompt display unit 103 or the on-air/talent display unit 104. In other embodiments, the given data signal provided in step 406 may comprise remote tele-command data for configuration and operational settings of one or more controls (e.g., controls 315) associated with the teleprompt display unit 103 (or another display unit or component of a camera system operating such controls). Such controls may include configuration and operational settings for cue lights, button lights, backlights, etc.

In some embodiments, step 402 includes utilizing the decapsulator 310 to separate the encapsulation into the two or more types of content to obtain the one or more video signals and the one or more data signals, and providing individual ones of the one or more video signals and the one or more data signals from the decapsulator 310 to the high speed serial switch 312. The high speed serial switch 312 may be used to route the given video signal (e.g., comprising a rendered prompt script) in step 404 to the de-serialiser 316 to generate a deserialised output, and to provide the deserialised output to the video scaler/LVDS driver 318 to generate an LVDS0/1 video signal for outputting to the teleprompt display unit 103 utilizing display circuitry 109. The high speed serial switch 312 may also be used in step 406 to route the given data signal to the on-air/talent display unit 104 or the message and time display unit 105. The high speed serial switch 312 may be further utilized to route other ones of the video signals (e.g., other than the given video signal routed to the teleprompt display unit 103) to the line driver 320 for delivery to the on-air/talent display unit 104. The high speed serial switch 312 may be further configured to receive additional video signal inputs that are processed by equalizers 322, and to route such additional video signal inputs to one or both of the teleprompt display unit 103 on the on-air/talent display unit 104.

As indicated previously, illustrative embodiments disclosed herein include systems, methods, apparatus, integrated circuits and computer program products comprising non-transitory storage media storing program code.

Figure 5:
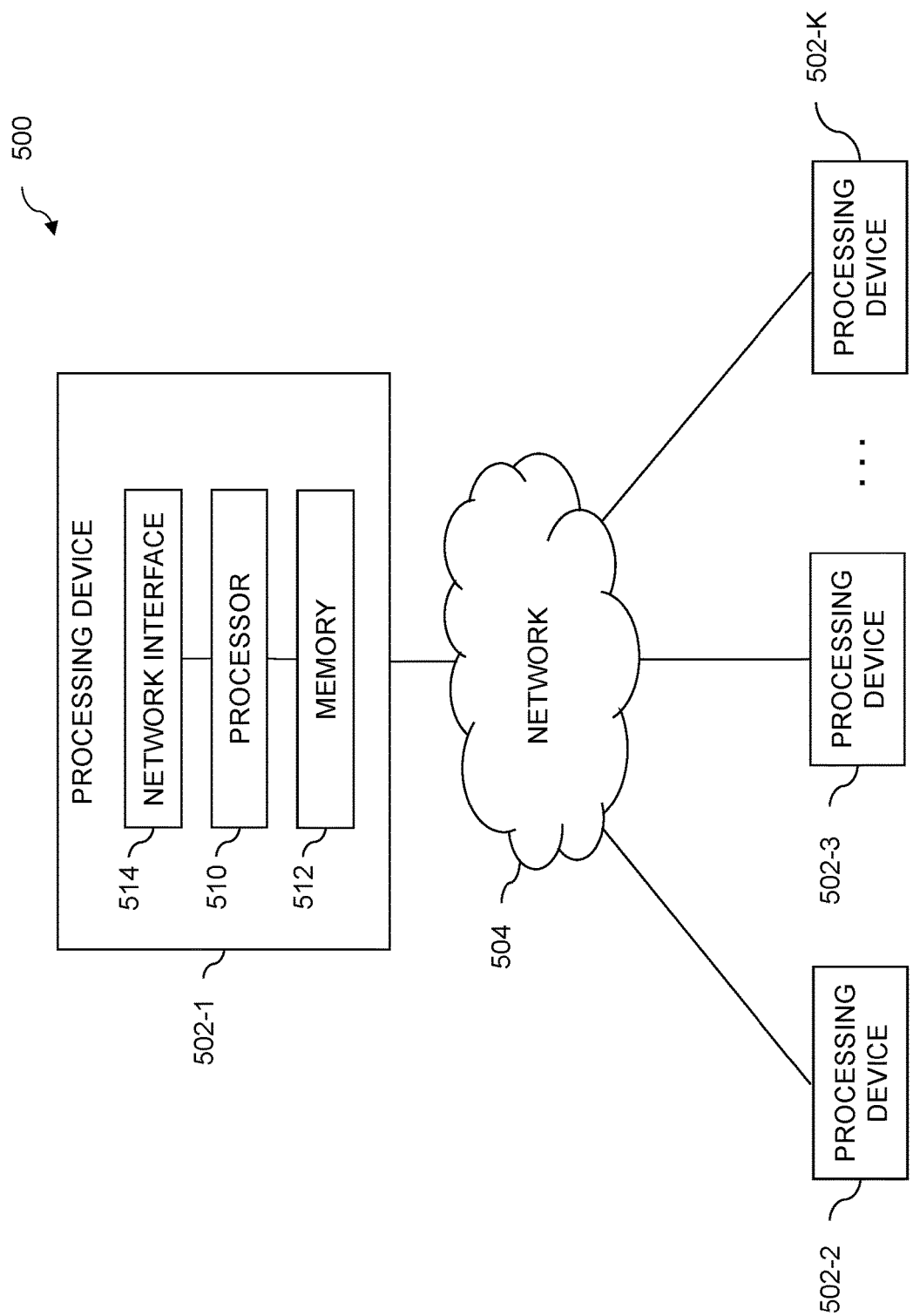
FIG. 5 shows an example of an information processing system that may be utilized to implement at least a portion of the FIG. 1 system.

The above-described systems and other processing entities described herein may be part of a camera system that incorporates other related systems such as a teleprompting system and an on-air/talent display system. A given such system entity as described herein is illustratively configured utilizing at least one processing device. FIG. 5 shows an example of an information processing system 500 that may be utilized to implement such system entities. The information processing system 500 in FIG. 5 includes a plurality of processing devices 502-1, 502-2, 502-3, . . . , 502-K (collectively, processing devices 502), which communicate with another over a network 504.

A given system or other processing entity described herein is illustratively configured utilizing one or more of the processing devices 502, such as processing device 502-1 which comprises a processor 510 coupled to a memory 512. The processor 510 executes software program code stored in the memory 512 in order to control the performance of processing operations and other functionality. The processing device 502-1 also comprises a network interface 514 that supports communication over one or more networks such as network 504.

The processor 510 may comprise, for example, a CPU as in the embodiment illustrated in FIG. 3, and/or a microprocessor, a microcontroller, an application-specific integrated circuit (ASIC), a field-programmable gate array (FPGA), an arithmetic logic unit (ALU), a digital signal processor (DSP), a graphics processing unit (GPU) or other similar processing device component, as well as other types and arrangements of processing circuitry, in any combination.

The memory 512 stores software program code for execution by the processor 510 in implementing portions of the functionality of the processing device 502-1. A given such memory that stores such program code for execution by a corresponding processor is an example of what is more generally referred to herein as a processor-readable storage medium having program code embodied therein, and may comprise, for example, electronic memory such as static random access memory (SRAM), dynamic random access memory (DRAM) or other types of random access memory, read-only memory (ROM), flash memory, magnetic memory, optical memory, or other types of storage devices in any combination.

Although not shown in FIG. 5, other ones of the processing devices 502-2 through 502-K are assumed to be similarly configured with respective processors, memories and network interfaces.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

One or more of the processing devices 502 in a given embodiment can include, for example, laptop, tablet or desktop personal computers, mobile telephones, or other types of computers or communication devices, in any combination.

Communications between the various elements of the information processing system 500 comprising processing devices 502 associated with respective display units or other system entities may take place over one or more networks, represented in FIG. 5 as network 504. Such networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

A camera system and/or one or more related systems as disclosed herein may be implemented using one or more processing platforms, or portions thereof.

For example, one illustrative embodiment of a processing platform that may be used to implement at least a portion of a system as disclosed herein is the information processing system 500 of FIG. 5, which includes the plurality of processing devices 502 which communicate with one another over the network 504.

Each processing device of such a processing platform comprises a processor coupled to a memory. As indicated above, the processor may comprise a CPU, a microprocessor, a microcontroller, an ASIC, an FPGA, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, an integrated circuit containing RAM, ROM, flash memory or other electronic memory, or any of a wide variety of other types of computer program products.

Also included in some processing devices is network interface circuitry, which is used to interface the processing device with the network and other system components, and may comprise conventional transceivers.

In some embodiments, a processing platform used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Again, these particular processing platforms and other systems disclosed herein are presented by way of example only, and other embodiments can comprise additional or alternative processing platforms, as well as numerous distinct processing platforms in any combination, with various types and arrangements of processing devices and other components.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers or other processing devices are possible in a camera system or set of related systems as disclosed herein. Such components can communicate with other elements of one or more systems over any type of network or other communication media.

As indicated previously, components or functionality of systems as disclosed herein can be implemented at least in part in the form of one or more software programs stored in memory and executed by a processor of a processing device.

Accordingly, a given component of a camera system or a set of related systems implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of systems described herein are exemplary only, and a given such system in other embodiments may include other elements in addition to or in place of those specifically shown, including one or more elements of a type commonly found in a conventional implementation of such a system.

For example, in some embodiments, a camera system may be configured to utilize the disclosed techniques to provide additional or alternative functionality in other contexts. The disclosed techniques can be similarly adapted for use in a wide variety of other types of camera systems or sets of related systems.

It is also to be appreciated that the particular process operations used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of systems and processing devices than those utilized in the particular illustrative embodiments described herein, and in numerous alternative signal distribution related contexts. Also, the particular types and configurations of system entities, processing devices and process operations can be varied in other embodiments. In addition, the particular signaling formats and types of video, data and/or metadata referred to herein in the context of describing aspects of certain illustrative embodiments need not be used in other embodiments. These and numerous other alternative embodiments will be readily apparent to those skilled in the art.

What is claimed is:

1. An apparatus comprising:
   at least one processing device comprising a processor coupled to a memory;
   the at least one processing device being configured:
      to receive an encapsulation of two or more types of content associated with a camera system, the two or more types of content comprising one or more video signals and one or more data signals;
      to separate the encapsulation into the two or more types of content to obtain the one or more video signals and the one or more data signals;
      to output at least a given one of the one or more video signals to a first display unit of the camera system; and
      to provide at least a given one of the one or more data signals to at least one of (i) a controller associated with the first display unit and (ii) a second display unit of the camera system different than the first display unit;
   wherein the at least one processing device comprises a serial switch coupled to the processor and a decapsulator coupled to the processor and the serial switch, the at least one processing device being configured to utilize the decapsulator to separate the encapsulation into the two or more types of content to obtain the one or more video signals and the one or more data signals, and to provide individual ones of the one or more video signals and the one or more data signals from the decapsulator to the serial switch.

2. The apparatus of claim 1 wherein the encapsulation of the two or more types of content associated with the camera system is received over a single physical bearer cable.

3. The apparatus of claim 2 wherein the single physical bearer cable comprises a single fibre optic cable.

4. The apparatus of claim 2 wherein the given data signal is provided to the second display unit over one or more additional physical bearer cables.

5. The apparatus of claim 1 wherein the encapsulation is received over an Internet Protocol (IP) interconnection.

6. The apparatus of claim 1 wherein the first display unit comprises a teleprompt display unit of the camera system, and wherein the second display unit comprises at least one of an on-air display unit of the camera system and a message and time display unit of the camera system.

7. The apparatus of claim 1 wherein the encapsulation of the two or more types of content for the camera system is received from at least one of a studio infrastructure and an outside broadcast host environment associated with the camera system.

8. The apparatus of claim 1 wherein the given video signal comprises a video signal comprising at least one of a rendered prompt script and one or more messages for display to one or more subjects.

9. The apparatus of claim 6 wherein the given data signal comprises remote tele-command data for configuration and operational settings of one or more controls associated with the teleprompt display unit, the given data signal being provided to the controller associated with the teleprompt display unit.

10. The apparatus of claim 1 wherein the at least one processing device further comprises a de-serialiser coupled to the serial switch and a video scaler/low voltage differential signaling (LVDS) driver coupled to the de-serialiser, the at least one processing device being configured to utilize the serial switch to route the given video signal comprising a rendered prompt script to the de-serialiser to generate a deserialised output, and to provide the deserialised output to the video scaler/LVDS driver to generate an LVDS0/1 video signal for outputting to the first display unit.

11. The apparatus of claim 1 wherein the at least one processing device further comprises a line driver coupled to the serial switch, the at least one processing device being configured to utilize the serial switch to route another one of the one or more video signals to the line driver for delivery to the second display unit.

12. The apparatus of claim 1 wherein the at least one processing device further comprises one or more equalizers coupled to the serial switch, the one or more equalizers being configured to receive and process one or more additional video signal inputs provided to the serial switch that are delivered from the serial switch to at least one of the first display unit and the second display unit.

13. The apparatus of claim 1 wherein the given data signal comprises at least one of configuration settings and operational settings for one or more lights of the camera system.

14. An apparatus comprising:
at least one processing device comprising a processor coupled to a memory;
the at least one processing device being configured:
to receive an encapsulation of two or more types of content associated with a camera system, the two or more types of content comprising one or more video signals and one or more data signals;
to separate the encapsulation into the two or more types of content to obtain the one or more video signals and the one or more data signals;
to output at least a given one of the one or more video signals to a first display unit of the camera system; and
to provide at least a given one of the one or more data signals to at least one of (i) a controller associated with the first display unit and (ii) a second display unit of the camera system different than the first display unit;
wherein the first display unit comprises a teleprompt display unit of the camera system;
wherein the second display unit comprises at least one of an on-air display unit of the camera system and a message and time display unit of the camera system; and
wherein the given data signal comprises at least one of messaging and timing information, the given data signal being provided to the message and time display unit.

15. The apparatus of claim 14 wherein the given data signal is also provided to at least one of the teleprompt display unit and the on-air display unit.

16. An apparatus comprising:
at least one processing device comprising a processor coupled to a memory;
the at least one processing device being configured:
to receive an encapsulation of two or more types of content associated with a camera system, the two or more types of content comprising one or more video signals and one or more data signals;
to separate the encapsulation into the two or more types of content to obtain the one or more video signals and the one or more data signals;
to output at least a given one of the one or more video signals to a first display unit of the camera system; and
to provide at least a given one of the one or more data signals to at least one of (i) a controller associated with the first display unit and (ii) a second display unit of the camera system different than the first display unit;
wherein the first display unit comprises a teleprompt display unit of the camera system;
wherein the second display unit comprises at least one of an on-air display unit of the camera system and a message and time display unit of the camera system;
wherein the given data signal comprises remote tele-command data for configuration and operational settings of one or more controls associated with the teleprompt display unit, the given data signal being provided to the controller associated with the teleprompt display unit; and
wherein the remote tele-command data comprises configuration and operational settings for at least one of one or more cue lights, one or more button lights and one or more backlights associated with the teleprompt display unit.

17. A computer program product comprising a non-transitory processor-readable storage medium having stored therein program code of one or more software programs, wherein the program code when executed by at least one processing device comprising a processor coupled to a memory causes the at least one processing device:
to receive an encapsulation of two or more types of content associated with a camera system, the two or more types of content comprising one or more video signals and one or more data signals;
to separate the encapsulation into the two or more types of content to obtain the one or more video signals and the one or more data signals;
to output at least a given one of the one or more video signals to a first display unit of the camera system; and to provide at least a given one of the one or more data signals to at least one of (i) a controller associated with the first display unit and (ii) a second display unit of the camera system different than the first display unit;

wherein the at least one processing device comprises a serial switch coupled to the processor and a decapsulator coupled to the processor and the serial switch, the program code when executed by the at least one processing device further causing the at least one processing device to utilize the decapsulator to separate the encapsulation into the two or more types of content to obtain the one or more video signals and the one or more data signals, and to provide individual ones of the one or more video signals and the one or more data signals from the decapsulator to the serial switch.

18. The computer program product of claim 17 wherein the encapsulation of the two or more types of content associated with the camera system is received over a single physical bearer cable.

19. A method comprising:

receiving an encapsulation of two or more types of content associated with a camera system, the two or more types of content comprising one or more video signals and one or more data signals;

separating the encapsulation into the two or more types of content to obtain the one or more video signals and the one or more data signals;

outputting at least a given one of the one or more video signals to a first display unit of the camera system; and providing at least a given one of the one or more data signals to at least one of (i) a controller associated with the first display unit and (ii) a second display unit of the camera system different than the first display unit;

wherein the method is performed by at least one processing device comprising a processor coupled to a memory; and wherein the at least one processing device comprises a serial switch coupled to the processor and a decapsulator coupled to the processor and the serial switch, the at least one processing device utilizing the decapsulator to separate the encapsulation into the two or more types of content to obtain the one or more video signals and the one or more data signals, and providing individual ones of the one or more video signals and the one or more data signals from the decapsulator to the serial switch.

20. The method of claim 19 wherein the encapsulation of the two or more types of content associated with the camera system is received over a single physical bearer cable.

* * * * *